US011691736B2

(12) United States Patent
Williams

(10) Patent No.: US 11,691,736 B2
(45) Date of Patent: Jul. 4, 2023

(54) PASSENGER SEATING ARRANGEMENT HAVING A SCREEN BETWEEN SEAT UNITS

(71) Applicant: UNITED AIRLINES, INC., Chicago, IL (US)

(72) Inventor: Andrew Williams, London (GB)

(73) Assignee: UNITED AIRLINES, INC., Chicago, IL (US)

( * ) Notice: Subject to any disclaimer, the term of this patent is extended or adjusted under 35 U.S.C. 154(b) by 118 days.

(21) Appl. No.: 17/043,466

(22) PCT Filed: Dec. 7, 2018

(86) PCT No.: PCT/GB2018/053561
§ 371 (c)(1),
(2) Date: Sep. 29, 2020

(87) PCT Pub. No.: WO2019/186091
PCT Pub. Date: Oct. 3, 2019

(65) Prior Publication Data
US 2021/0114732 A1    Apr. 22, 2021

Related U.S. Application Data

(63) Continuation of application No. 16/162,142, filed on Oct. 16, 2018, now Pat. No. 10,370,108.

(30) Foreign Application Priority Data

Mar. 30, 2018    (GB) ..................................... 1805330

(51) Int. Cl.
*B64D 11/06*    (2006.01)
(52) U.S. Cl.
CPC ...... *B64D 11/0606* (2014.12); *B64D 11/0601* (2014.12); *B64D 11/0604* (2014.12);
(Continued)

(58) Field of Classification Search
CPC ............ B64D 11/0606; B64D 11/0601; B64D 11/0604; B64D 11/0641; B64D 11/0646; B64D 11/0605; B60N 2/01
See application file for complete search history.

(56) References Cited

U.S. PATENT DOCUMENTS 2,947,349 A    8/1960    Kryter
7,178,871 B1   2/2007    Round et al.
(Continued)

FOREIGN PATENT DOCUMENTS

CA    2581736 A1    2/2003
EP    0053012 A1    6/1982
(Continued)

OTHER PUBLICATIONS

Written Opinion of the International Searching Authority issued in International Application No. PCT/GB2018/053561, dated Feb. 21, 2019, 7 pages.
(Continued)

*Primary Examiner* — Christopher D Hutchens
(74) *Attorney, Agent, or Firm* — Marshall, Gerstein & Borun LLP

(57) ABSTRACT

A passenger seating arrangement for use in an aircraft cabin, wherein the seat units are arranged in an inwardly facing herringbone layout. A screen is arranged to separate a passenger in each aft seat unit from a passenger in a fore seat unit in front of it in the column. The screen comprises an upper part and a lower part below the upper part, the upper and lower parts of the screen being offset relative to each other, for example to create an overhang on the side of the screen facing the aft seat unit, such that, the upper part provides shoulder space for a passenger seated in the fore seat unit, and the lower part provides arm space, in which there is an arm rest, for a passenger seated in the aft seat unit.

16 Claims, 11 Drawing Sheets

(52) U.S. Cl.
CPC ...... *B64D 11/0641* (2014.12); *B64D 11/0646* (2014.12); *B64D 11/0605* (2014.12)

(56) References Cited

U.S. PATENT DOCUMENTS

| | | | |
|---|---|---|---|
| 7,252,332 B2 * | 8/2007 | Thompson | B64D 11/00153 297/217.3 |
| 7,918,504 B2 | 4/2011 | Thompson | |
| D660,027 S * | 5/2012 | Porter | D6/356 |
| 9,126,689 B2 * | 9/2015 | Porter | B64D 11/0636 |
| 10,370,108 B1 | 8/2019 | Williams | |
| 2008/0088160 A1 | 4/2008 | Johnson | |
| 2010/0038484 A1 | 2/2010 | Ersan | |
| 2014/0300152 A1 | 10/2014 | Park et al. | |
| 2015/0001341 A1 | 1/2015 | Ersan et al. | |
| 2015/0130244 A1 | 5/2015 | Wyss | |
| 2015/0225086 A1 * | 8/2015 | Darbyshire | B64D 11/0641 244/118.6 |
| 2015/0298812 A1 | 10/2015 | Jasny et al. | |
| 2017/0081030 A1 | 3/2017 | Clucas et al. | |
| 2017/0129611 A1 | 5/2017 | Morgan | |
| 2017/0233057 A1 | 8/2017 | Charles et al. | |
| 2017/0327232 A1 | 11/2017 | Morgan | |
| 2018/0079508 A1 | 3/2018 | Carlioz et al. | |
| 2018/0281969 A1 | 10/2018 | Lee | |
| 2019/0077512 A1 * | 3/2019 | Bentley | B64D 11/0601 |
| 2019/0092475 A1 * | 3/2019 | Carlioz | B64D 11/0641 |
| 2019/0315467 A1 * | 10/2019 | Nicholas | B64D 11/0602 |

FOREIGN PATENT DOCUMENTS

| | | |
|---|---|---|
| EP | 2907754 A1 | 8/2015 |
| EP | 2944571 A1 | 11/2015 |
| FR | 3006667 A1 | 12/2014 |
| GB | 2326824 A | 1/1999 |
| GB | 2405791 A | 3/2005 |
| GB | 2510765 A | 8/2014 |
| WO | 0021831 A2 | 4/2000 |
| WO | 03013903 A1 | 2/2003 |
| WO | 2014115107 A1 | 7/2014 |
| WO | 2018078377 A1 | 5/2018 |

OTHER PUBLICATIONS

International Search Report issued in International Application No. PCT/GB2018/053561, dated Feb. 21, 2019, 4 pages.
European Search Report for European Application No. 18211000, two pages, dated Feb. 1, 2019.
Jonny Clark "Thompson Vantage Solo Offers A New Herringbone Option For Narrow-bodies", https://thedesignair.net/2017/09/11/thompson-vantage-solo-offers-a-new-herringbone-option-for-narrow-bodies, four pages, Sep. 11, 2017.
David Flynn "The Next Generation in Airbus, Boeing single-aisle business class", https://www.ausbt.eom.au/the-next-generation-in-airbus-boeing-single-aisie-business-class, 12 pages, Jul. 31, 2017.
United Kingdom Search Report for Application No. GB1805330.6, two pages, dated Sep. 19, 2018.

* cited by examiner

PASSENGER SEATING ARRANGEMENT HAVING A SCREEN BETWEEN SEAT UNITS

FIELD OF THE INVENTION

The present invention relates to a passenger seating arrangement, and to sets of seat units for use in a passenger seating arrangement.

BACKGROUND OF THE INVENTION

Aircraft passenger seating arrangements having convertible seat units that have both a seat configuration, and a flat-bed configuration are well-known. These convertible seat units are typically provided in premium class (e.g. business class and/or first class) cabins of an aircraft. In the seat configuration, the seat unit typically provides a relatively upright seat, whereas in the flat-bed configuration, the seat unit tends to provide a substantially planar sleeping surface for supporting the passenger. The seat units shown in GB2326824 (British Airways), WO03013903 (Virgin Atlantic) and U.S. Pat. No. 7,178,871 (British Airways) are examples of such convertible seat units (often referred to as having 'lie-flat' seats) that have both a seat configuration, and a flat-bed configuration which offers improved comfort over a reclined seat. Lie-flat seats have been increasingly popular over the last decade or so.

GB2326824 and WO03013903 mentioned above are examples of so-called herringbone arrangements in a business class arrangement, in which the seats are orientated at an angle to the longitudinal axis of the aircraft. In narrow-body (e.g. single-aisle) aircraft it tends to be desirable to adopt a relatively high herringbone angle/low pitch in order to efficiently use the available cabin space. However, herringbone layouts for narrow-body aircraft have tended to be dismissed within the aircraft industry as being impractical as it has not been possible to obtain desired pitch/angle whilst retaining a useable width/size of seat. Instead, there tends to be a preference for in-line arrangements such as those suggested in U.S. Pat. No. 7,918,504 (Thompson). U.S. Pat. No. 7,918,504 discloses an aircraft cabin in which there are rows of seat units, each unit having a forward facing lie-flat seat that faces in a direction parallel to the longitudinal axis of the cabin.

There is a need for an improved passenger seating arrangement capable of addressing the above-mentioned problems.

SUMMARY OF THE INVENTION

According to an embodiment, there is provided a passenger seating arrangement in an aircraft cabin, the passenger seating arrangement comprising a column of seat units located adjacent an aisle, the column of seat units and the aisle both extending in a longitudinal direction parallel to the longitudinal axis of the aircraft cabin. The column comprises a multiplicity of seat units, arranged consecutively along the longitudinal direction. Each seat unit comprises a plurality of moveable seating elements such that the seat unit is configurable between a seating configuration in which the seating elements are arranged to form a seat having a seat pan and seat back, and a flat-bed configuration in which the seating elements are arranged to form a surface for a flat-bed. In each seat unit, the seating elements are orientated at an acute angle to the longitudinal direction and face inwardly towards the aisle. The arrangement comprises a multiplicity of screens, each screen being arranged to respectively separate a passenger in a first seat unit in the column from a passenger in a second seat unit to one side of it in the column. Each screen comprises a space-sharing region having an upper part and a lower part below the upper part, in which: the upper and lower parts of the screen are offset relative to each other towards the first and second seat units respectively, such that the upper part provides shoulder space for the passenger in the second seat unit when the seat units are in the seating configuration, and the lower part provides arm space for the passenger in the first seat unit when the seat units are in the seating configuration.

It has been recognised that in an arrangement in which the seating elements are orientated at an acute angle to the longitudinal direction, some space can be shared between seated passengers in adjacent seat units to achieve a relatively high PAX density (i.e. relatively high numbers of passengers per unit area in the cabin). More specifically, by providing screens having the space-sharing region, a seated passenger in one seat unit (e.g. the second seat unit) can use a relatively high space (provided by virtue of the upper part of the screen) above a relatively low space (provided by virtue of the lower part of the screen) that can be used by a seated passenger in the adjacent seat unit (e.g. the first seat unit) the other side of the screen. This may enable a passenger seating arrangement utilising a relatively high angle/low pitch to be achieved. It will be appreciated that the pitch is defined as the distance, along the longitudinal direction, between two corresponding common points on adjacent seat units.

The upper part of the space-sharing region is preferably at the shoulder-height of a seated passenger. The lower part of the space-sharing region is preferably at the arm, for example elbow, height of a seated passenger.

In each seat unit, the seating elements are orientated at an acute angle to the longitudinal direction and face inwardly towards the aisle. Such an arrangement is typically referred to as an inwardly-facing herringbone arrangement. Each set of seating elements, and more preferably each seat unit, may comprise a central axis. The central axis preferably extends through the centre of the seating elements (for example it may bisect a seat pan and/or back-rest of the seat when in the seating configuration). The central axis is preferably fixed (for example the seat units preferably do not comprise swivel seats). The angle of the seating elements is preferably defined as the angle between the central axis and the longitudinal direction. In some embodiments, the angle of the seating elements may be defined as the angle between a line defining the maximum useable bed length, and the longitudinal direction.

The examples herein may be implemented in forward-facing or rearward-facing herringbone arrangements. In some embodiments, the first seat unit may be a fore seat unit, and the second seat unit may be an aft seat unit behind it in the column (for example in a rearward-facing herringbone). In some embodiments, the first seat unit is an aft seat unit, and the second seat unit is a fore seat unit in front of it in the column (for example in a forward-facing herringbone). It will be appreciated that any references herein to features of the first and second seat units may be equally applicable to references to the aft/fore and fore/aft seat units as appropriate (and vice versa).

A lateral direction may extend perpendicular to the longitudinal direction. The lateral direction may therefore extend across the width of the cabin. The seat units are preferably all in the same lateral position. When the seat units are in the seating configuration, the seating elements of each seat unit may all be at the same lateral position in the cabin. For example, in each seat unit, the seating elements may be positioned towards the rear of the seat unit, in proximity to the aircraft sidewall.

The seat back of the second seat unit may be adjacent the seat pan of the first seat unit. For example, the acute angle (of the seating elements in the arrangement) and/or pitch between seat units may be such that the seat back of the second seat unit is adjacent the seat pan of the first seat unit.

The space-sharing region of the screen may be located between the seat back of the second seat unit and the adjacent seat pan of the first seat unit. Such an arrangement may be beneficial because it locates the space-sharing region at the location at which adjacent seated passengers' shoulders and lower arms tend to be located.

In the space-sharing region, the upper part of the screen may overhang the seat pan of the first seat unit, when the seat units are in the seating configuration. Such an arrangement may provide shoulder space for the second seat unit, without substantially impacting on the useable space for the passenger in the first seat unit (because that overhang may be above the arm space of the passenger in the first seat unit). The lower part of the screen preferably does not overhang the seat pan of the first seat unit when the seat units are in the seating configuration.

Each first seat unit may comprise an armrest located within the arm space created by the relative offset between the upper and lower parts of the screen. The armrest may comprise an armrest surface located within the arm space. The armrest surface may be configured to receive the passenger's forearm.

Each second seat unit may comprise an armrest located forward of the armrest of the first seat unit. It will be appreciated that the forwards direction in this context is relative to the seat unit (for example the forwards direction may be substantially aligned with the direction in which the passenger faces in the seating configuration and/or the central axis of the seat unit). The armrest may comprise an armrest surface. The armrest surface may be configured to receive the passenger's forearm. The armrest of the second seat unit is on the opposite side of the screen from the armrest of the first seat unit. It will be appreciated that the above-mentioned armrests of the first and second seat units are for receiving the opposing arms of their respective passengers. For example the armrest of the first seat unit may be for receiving a passenger in the first seat unit's right arm, and the armrest of the second seat unit may be for receiving a passenger in the second seat unit's left arm.

The column comprises a multiplicity of seat units, arranged consecutively along the longitudinal direction. The arrangement comprises a plurality, and preferably a multiplicity of screens, each screen being arranged to respectively separate a passenger in a first seat unit in the column from a passenger in a second seat unit to one side of it in the column. Some features described herein are with reference to the first and/or second seat units. However, it will be appreciated that these pairs of seat units are repeated along the column either side of each screen. Thus, for any given seat unit, the seat unit preferably has the features of the first and the second seat unit (those labels of 'first' or 'second' seat unit merely being assigned depending on which side of a screen it is being considered from). By way of example, each seat unit may have, on one side, an armrest within the arm space created by the offset of the lower part of the screen away from the upper part, and on the other side, a shoulder space created by the offset of the upper part of the adjacent screen away from the lower part of that screen. Such an arrangement may be repeated throughout consecutive seat units of the column.

The space-sharing region may comprise an inflection at which the screen transitions from the upper part to the lower part. The inflection may be smooth (for example a gentle curve). The inflection may be sharp (for example a step change in the screen profile). The inflection is preferably an identifiable part of the screen within which the screen transitions between the upper and lower parts.

The screen may be a thin structure. The screen is preferably thin relative to the magnitude of the offset between the upper and lower parts. Thus, the relative offset between the upper and lower parts may be apparent by way of a recess on one side of the screen, and a corresponding protrusion on the other side of the screen.

The screen comprises the space-sharing region. To at least one side, and preferably to both sides, of that space-sharing region the screen may be follow a uniform profile. For example, outside of the space-sharing region, the upper and lower parts of the screen may follow substantially the same profile.

The screen may extend behind the seat back. The screen may at least partially wrap around the seat back. The screen may extend from adjacent the aircraft sidewall. The screen preferably extends from one end located adjacent the sidewall, towards the aisle. The screen may follow a curved path. The screen may follow a straight path.

Each seat unit may comprise a base divider. The base divider may be arranged to separate a lying down passenger in the first seat unit in the column from a lying down passenger in the second seat unit to one side of it in the column, when the seating elements are in the bed configuration. Each screen may be located on top of a respective base divider. In the space-sharing region the upper part of the screen may overhang the base divider. The lower part of the screen may be substantially in line with the base divider. Outside the space-sharing region, the screen may follow the base divider. Outside the space-sharing region, the screen may overhang the base divider.

Preferably all of the seat units are substantially identical. Preferably all of the screens are substantially identical.

Embodiments have been found to be especially beneficial for use on relatively high angle/low pitch layouts. The acute angle at which the seating elements are orientated to the longitudinal direction may be at least 45 degrees. The acute angle at which the seating elements are orientated to the longitudinal direction may be between 47 and 51 degrees. The acute angle at which the seating elements are orientated to the longitudinal direction may be between 48 and 50 degrees. The acute angle at which the seating elements are orientated to the longitudinal direction may be substantially equal to 49 degrees.

The pitch between consecutive seat units in the column may be less than 33 inches. The pitch between consecutive seat units in the column may be less than 32 inches. The pitch between consecutive seat units in the column may be less than 31 inches. The pitch between consecutive seat units in the column may be less than 30 inches. The pitch between consecutive seat units in the column may be between 24 and 33 inches. The pitch between consecutive seat units in the column may be between 24 and 30 inches. The pitch between consecutive seat units in the column may be between 25 and 29 inches. The pitch between consecutive seat units in the column may be between 27 and 29 inches. The pitch between consecutive seat units in the column may be substantially equal to 28 inches.

In the flat-bed configuration, the bed length may be at least 75 inches. In the flat-bed configuration, the bed length may be between 77 and 78 inches.

Embodiments have been found to be especially beneficial for use on narrow body aircraft. The column of seat units may be adjacent the aisle on one side, and adjacent the aircraft sidewall on the other side. The cabin may comprise a second column of seat units on the opposite side of the aisle, the second column being arranged as described with reference to the first column. The aisle may extend along the centre line of the cabin. The second column may be adjacent the aisle on one side, and adjacent the aircraft sidewall on the other side. Thus, the seating arrangement may be on a single-aisle aircraft.

In some embodiments, there is provided a multiplicity of seat units for forming the passenger seating arrangement described herein. One or more screens may be arranged to respectively separate a passenger in a first seat unit in the multiplicity of units, from a passenger in a second seat unit to one side of it in the multiplicity of units.

In some embodiments, there is provided a seat unit for use as one of the seat units in the passenger seating arrangement described herein. A screen may be arranged for separating a passenger in the seat unit from a passenger in a second seat unit to be installed one side of it.

In some embodiments, there is provided a passenger seating arrangement in an aircraft cabin, the passenger seating arrangement comprising a column of seat units, each seat unit being configurable between a seating configuration and a flat-bed configuration. The seat units are arranged in an inwardly facing herringbone layout such that when the seat units are in the seating configuration, a seat pan of each aft seat unit is adjacent a seat back of a fore seat unit in front of it in the column. A screen is arranged to separate a passenger in each aft seat unit in the column from a passenger in a fore seat unit in front of it in the column. In the region between the seat pan of each aft seat unit and the adjacent seat back of the respective fore seat unit, the screen comprises an upper part and a lower part below the upper part, the upper and lower parts of the screen being offset relative to each other to create an overhang on the side of the screen facing the aft seat unit, such that, the upper part provides shoulder space for a passenger seated in the fore seat unit, and the lower part provides arm space for a passenger seated in the aft seat unit.

In some embodiments, there is provided a seating unit having a screen with space-sharing regions that define a first shoulder region for a primary passenger, while simultaneously providing an elongated arm rest for an adjacent passenger, through an inflection positioned to define upper and lower concave regions for the primary and adjacent passengers respectively.

In some embodiments, there is provided a screen for use as the screen described herein. The screen may comprise an upper part and a lower part below the upper part, the upper and lower parts of the screen being offset relative to each other to create an overhang on the side of the screen facing an aft seat unit, such that, the upper part provides shoulder space for a passenger seated in a fore seat unit, and the lower part provides arm space for a passenger seated in the aft seat unit.

It will of course be appreciated that features described in relation to some embodiments may be incorporated into other embodiments. For example, the apparatus of an embodiment may incorporate any of the features described with reference to the apparatus of another embodiment and vice versa.

DESCRIPTION OF THE DRAWINGS

Embodiments of the present invention will now be described by way of example only with reference to the accompanying schematic drawings of which:

FIG. 2b is a view of the screen between the two of the seat units in FIG. 2a but from above a second seat unit in front of the first seat unit in FIG. 2a;

DETAILED DESCRIPTION

Figure 1A:
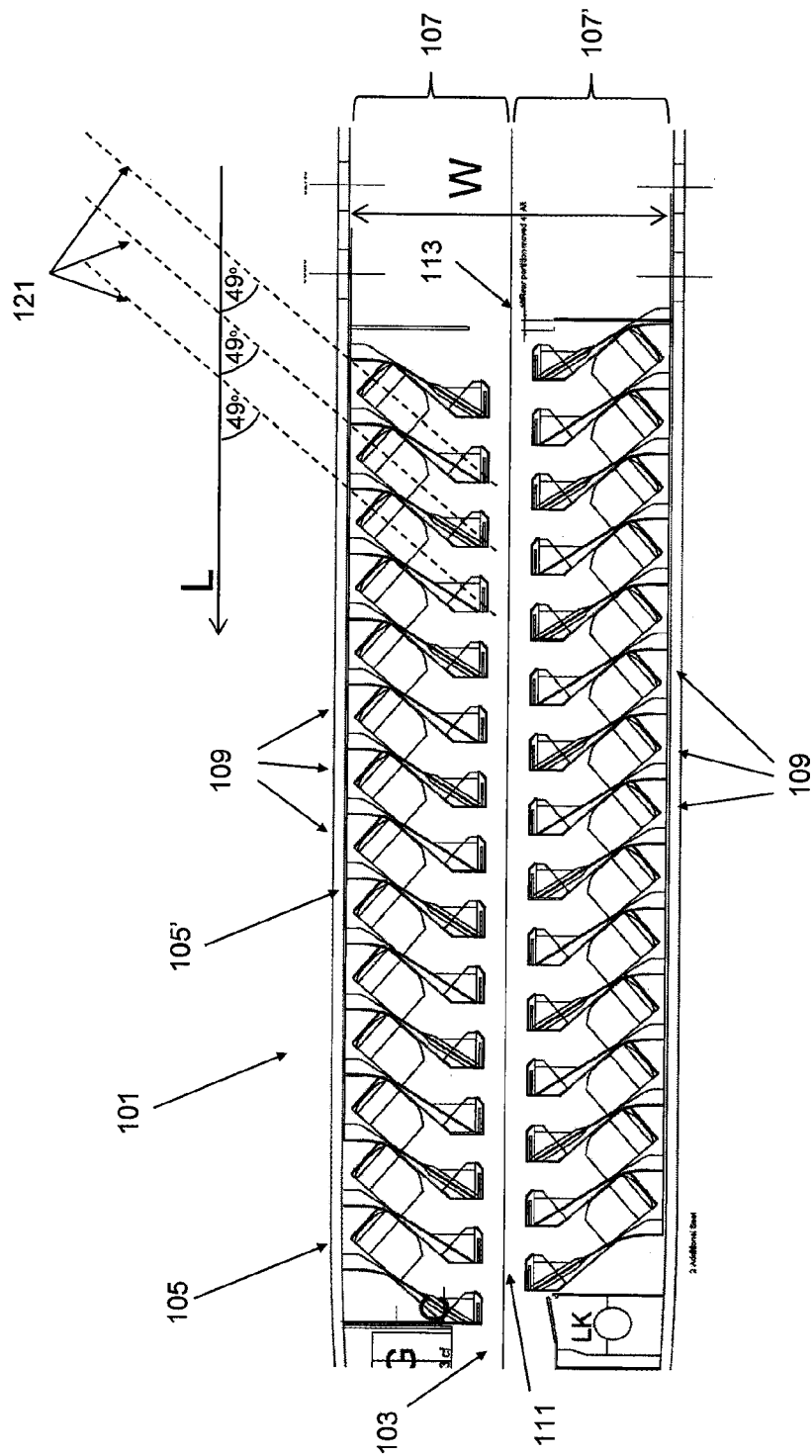
FIG. 1a shows a cabin in an aircraft in which a passenger seating arrangement of a first embodiment is installed.

Referring first to FIG. 1a, the passenger seating arrangement 101 of the first embodiment is located in an aircraft cabin 103 of a narrow body aircraft 105 such as a Boeing 757-200, or 737-900. The passenger seating arrangement 101 comprises a column 107 of seat units 109 (described in more detail with reference to FIGS. 1b-1e) located adjacent a single aisle 111 running along the centre of the aircraft cabin. The column 107 of seat units and the aisle 111 both extend in a longitudinal direction (L) parallel to the longitudinal axis 113 of the aircraft cabin.

The column 107 comprises a multiplicity of seat units 109, arranged consecutively along the longitudinal direction. A second column 107' is located the other side of the aisle and is substantially symmetrical with the first column, across the axis 113. Features described herein tend to be described with reference to the first column 107, but it will be appreciated that corresponding features are also found in the other column 107' of seat units.

In each seat unit 109, the seating elements (described in more detail below) are orientated at an angle of 49 degrees to the longitudinal direction (L) and face inwardly towards the aisle. The angle is measured between the central axis 121 of each seat (that central axis 121 extends through the centre of the seat pan and back rest and is shown schematically bisecting the seats in FIGS. 1b and 1c). Such an arrangement is typically referred to as an inwardly-facing herringbone. In the first embodiment, the herringbone is also forward-facing and at a relatively large (steep) angle. Correspondingly the pitch between consecutive seat units is relatively small (it is 28 inches in the first embodiment).

A lateral direction W extends across the width of the cabin, perpendicular to the longitudinal direction L. The seat units 109 in each column 107 are all in the same lateral position. When the seat units 109 are in the seating configuration (as shown in FIG. 1a), the seating elements of each seat unit 109 are all at the same lateral position in the cabin, namely towards the rear of the seat unit 109, in proximity to the aircraft sidewall 105'.

Figure 1B:
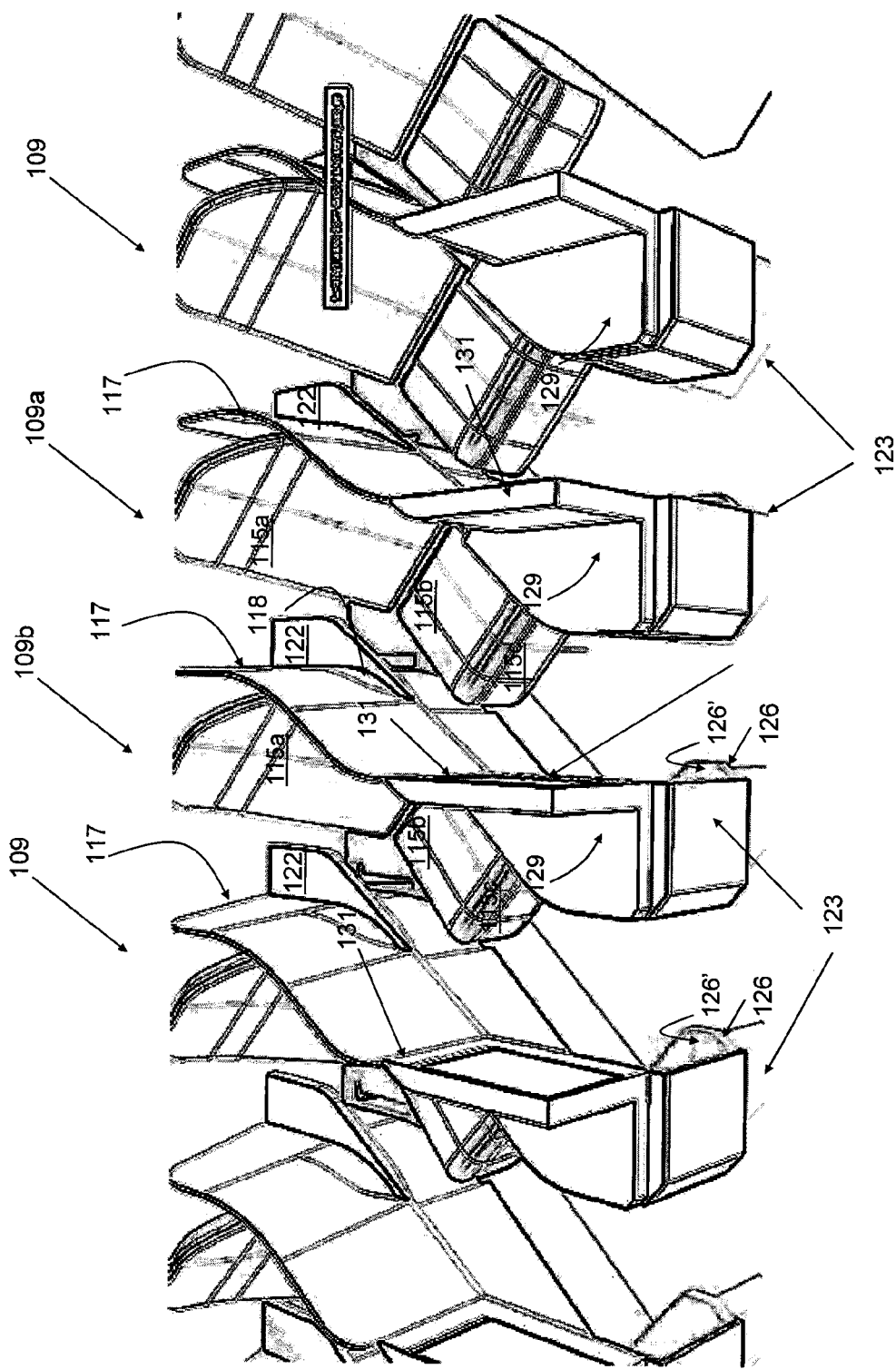
FIGS. 1b and 1c show part of the column of seat units in FIG. 1a; the seat units being shown in the seating configuration and the flat-bed configuration respectively.
Figure 1C:
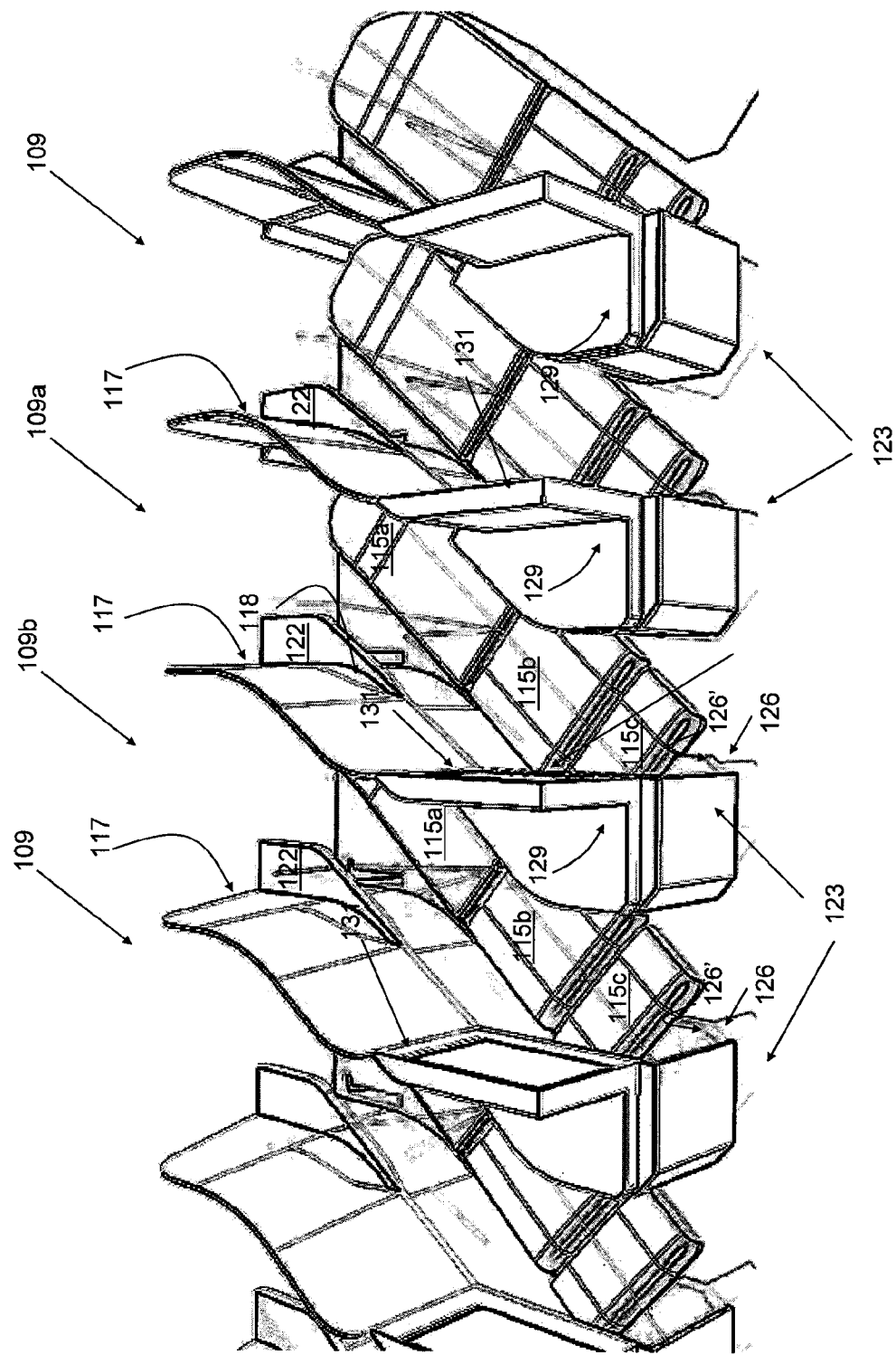
Figure 1D:
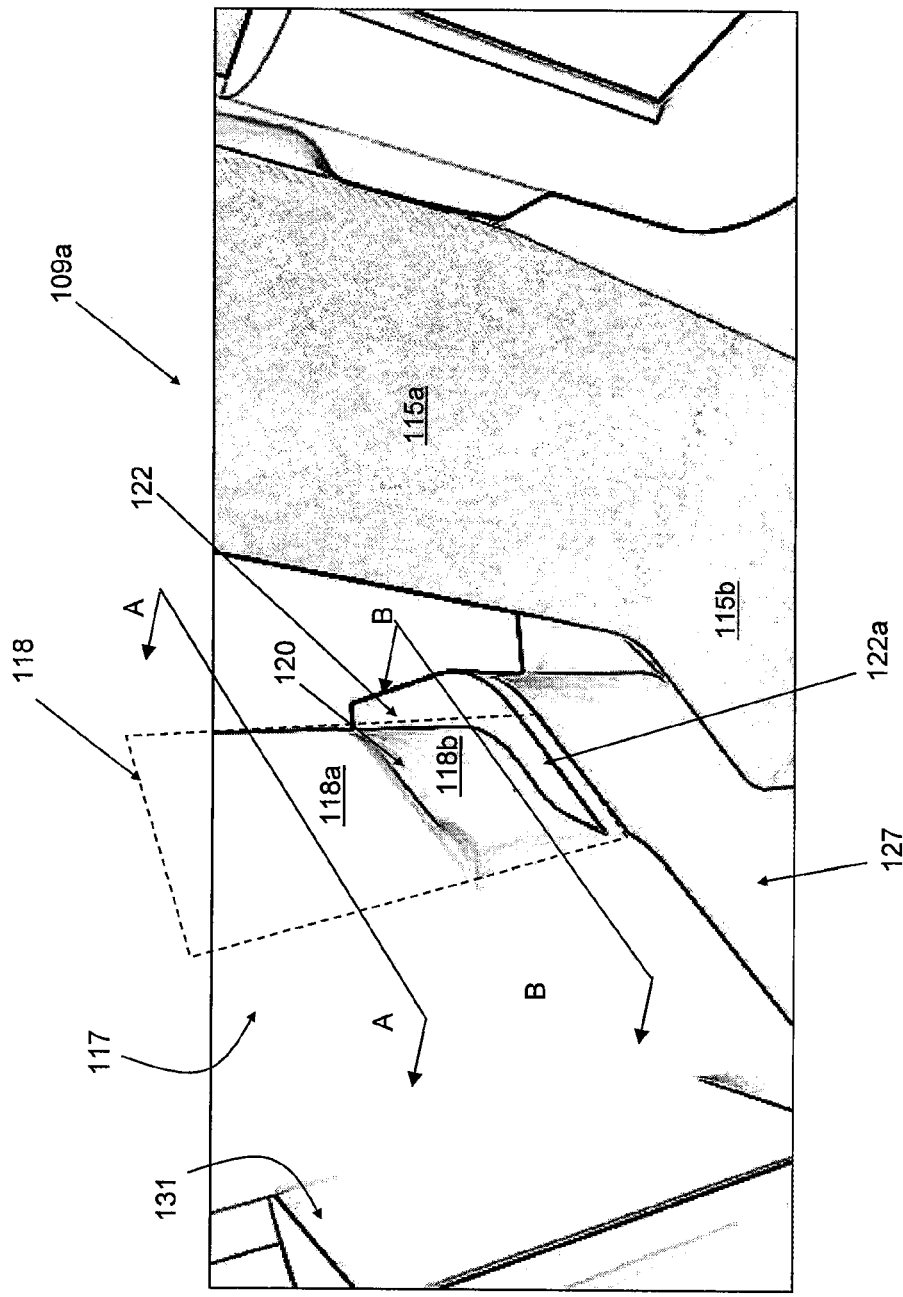
FIG. 1d is a close-up view of a screen between two of the seat units in the first embodiment, showing the space-sharing region.
Figure 1E:
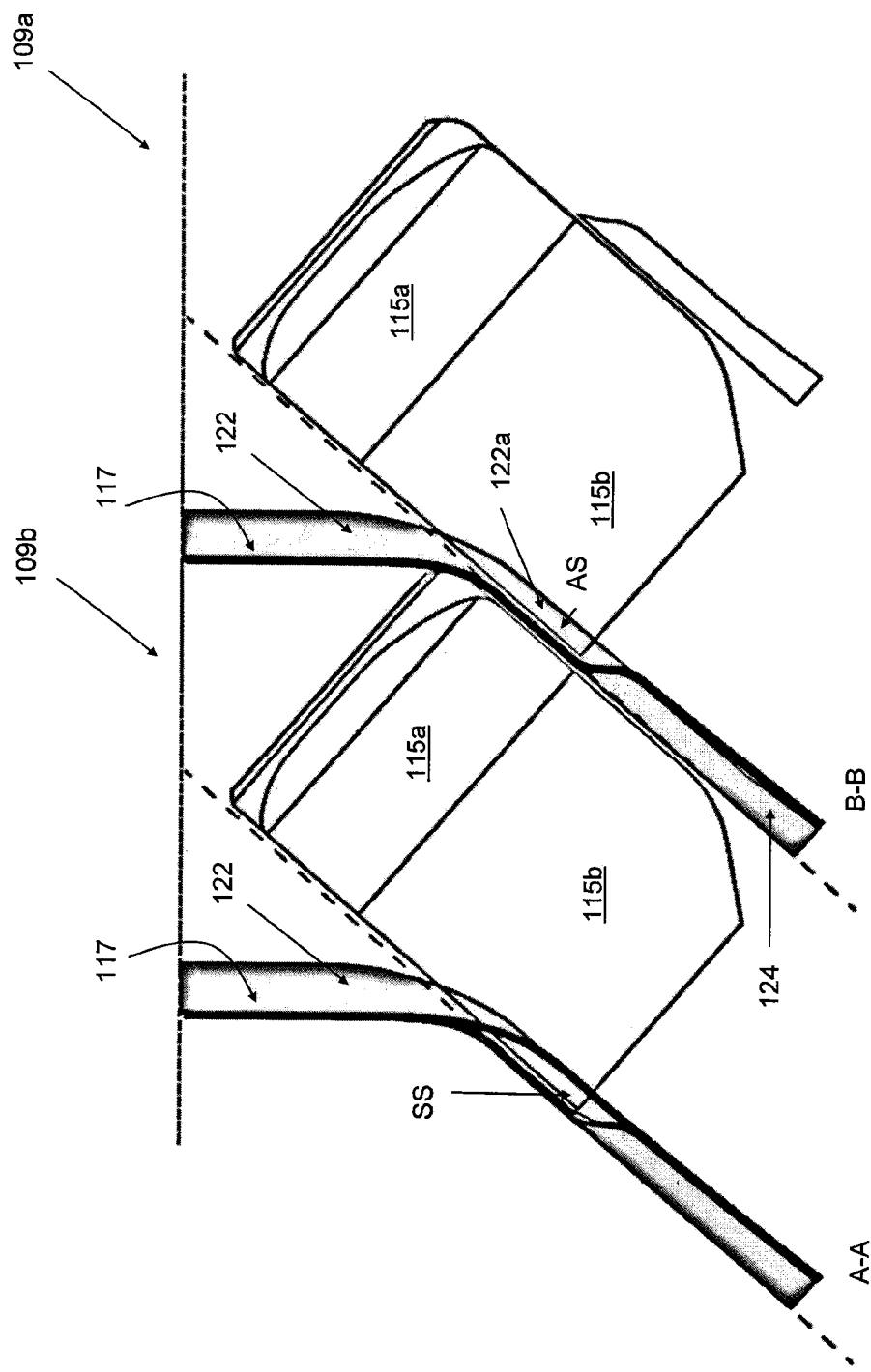
FIG. 1e is a schematic plan view of two of the seat units in the first embodiment, and showing the profile of the screen at two different heights.

As is most clearly shown in FIGS. 1a and 1e, the angle and pitch of the layout is such that the seat back of one seat unit is adjacent the seat pan of the seat unit behind it in the column.

FIGS. 1b and 1c show part of the column 107 of seat units 109 in the arrangement according to the first embodiment. Referring now to FIG. 1b, each seat unit 109 comprises a plurality of moveable seating elements in the form of a seat back 115a, seat pan 115b, and leg rest 115c. FIG. 1b shows the seat units in a seating configuration in which the seating elements are arranged to form a seat in which the passenger may sit. Each seat unit is also configurable into a flat-bed configuration in which the seating elements are arranged to form a substantially co-planar surface for a flat-bed. The seat units in this configuration are shown in FIG. 1c. Seat units that are convertible to flat-beds are known per se, and the precise manner in which the seating elements are rearranged to form the bed (e.g. the recline/convert mechanism) need not be described further in the context.

Each seat unit 109 comprises a foot-receiving structure 123 for receiving the feet of a passenger when the unit is in a flat-bed configuration. The foot-receiving structure comprises a foot-supporting surface. In this embodiment, the foot-supporting surface 126' is part of an ottoman 126 within the foot-receiving structure (although in other embodiments the foot-supporting surface may take a different form). The foot-supporting surface 126' is coplanar with the seating elements when the unit 109 is in the bed configuration and the foot-supporting surface forms part of the bed surface.

Above the ottoman 126 is a flat table surface 129 which is for use by a passenger in the adjacent seat unit. Directly beneath the table surface 129 is a horizontal slot for receiving a pull-out table (not shown).

An IFE monitor 131, when in a stowed position for Taxi Take-off and Landing (TTOL), extends along one side of that table 129. The monitor 131 is attached by a hinge to the end of the curved screen 117, and can move from this stowed position, into an in-use position (not shown) in which it faces the passenger.

The arrangement of the first embodiment comprises a multiplicity of curved screens 117, each screen 117 being arranged to respectively separate a passenger in an aft seat unit 109a from a passenger in a fore seat unit 109b in front of it in the column.

For the sake of clarity, in FIG. 1b, only a single pair of seat units 109a, 109b are labelled, and in FIGS. 1d and 1e only one pair 109a, 109b and one screen 117 is described. However, it will be appreciated that substantially identical seat units and screens 117 are repeated along the column 107. For every other screen 117, the pairs are identical to that described because there is no overlap in fore/aft seat units. For each screen either side of the pair labelled 109a, 109b, it is necessary to notionally re-label the seat units in the sense that the aft seat unit 109a becomes the fore seat unit of the pair behind, and the fore seat unit 109b becomes the aft seat unit of the pair in front. Nevertheless, it will be appreciated that the respective features of each seat unit are the same, and are simply repeated along the column 107, so reference herein to features of the aft/fore seat units 109a, 109b is applicable to all seat units within the column.

Each screen 117 comprises a thin structure extending from the rear of the seat back 115a (and in proximity to the sidewall 115') towards the aisle 111. The screen is positioned above a base divider 127, arranged to support the screen and separate a lying down passenger in the aft seat unit from a lying down passenger in the fore seat unit.

Throughout most of the screen, the screen follows a substantially similar profile at all heights and is therefore generally smooth sided. Each screen does, however, also comprise a space-sharing region 118, identifiable by virtue of the recess/overhang on one side of the screen (see FIG. 1d) and a corresponding protrusion/recess on the other side (not visible in FIG. 1d, shown in FIGS. 2a and 2b with reference to the second embodiment). The space-sharing region is located in the screen at the location between the seat back and the seat pan of adjacent seat units. That space-sharing region will now be described in more detail with reference to FIGS. 1d and 1e:

The space-sharing region 118 comprises an upper part 118a and a lower part 118b. The upper part 118a transitions to a lower part 118b at a curved inflection 120. The upper and lower parts of the screen are offset relative to each other towards the aft 109a and fore 109b seat units respectively. This means there is a recess at the lower part 118b of the screen 117 on the side of the aft seat unit, above which the upper part 118a overhangs. Equally for the fore seat unit 119b, there is a protrusion at the lower part of the screen 117, but additional space above the protrusion in the upper part of the screen 118a.

The upper part 118a is at the shoulder height of a seated passenger. The relative offset therefore provides shoulder space (SS) for a seated passenger in the second seat unit 109b (when the seat units are in the seating configuration). The lower part 118b is at the elbow height of a seated passenger. The relative offset therefore provides arm space (AS) for the passenger in the aft seat unit 109a (when the seat units are in the seating configuration). This is also illustrated in FIG. 1e.

FIG. 1e shows a plan view of an aft seat unit 109a and a fore seat unit 109b. The view in FIG. 1e shows the profile of the upper part 118a (i.e. a section along A-A in FIG. 1d) on the left-most screen. The view in FIG. 1e also shows the profile of the lower part (i.e. a section along B-B in FIG. 1d) on the right-most screen. Looking at the left-most screen in FIG. 1e, the shoulder space (SS) enabled by the relative offset of the upper part of the screen 118a can be readily identified. Looking at the right-most screen in FIG. 1e, the arm space (AS) enabled by the relative offset of the lower part of the screen 118b can also be readily identified. Although these are illustrated on different screens in FIG. 1e, it will be appreciated that each screen 117 has both of these spaces located above one another.

A utility surface 122 extends along the rear screen facing the aft-seat unit. This transitions into an arm rest 122a, located in the arm space AS created by the relative offset between the upper and lower parts 118a/b. The fore seat unit 109b also comprises an armrest 124 located forward of the armrest 122a of the first seat unit 109a, and on the opposite side of the screen 117. Due to the herringbone layout, each seat unit 109 therefore has an armrest 122a on one side located within the arm space AS, and another armrest 124 on the other side of the unit located forward of the arm space AS of the adjacent seat unit.

By providing the space-sharing region described above, the first embodiment allows the seat units to be arranged in a relatively high angle/low pitch layout. Embodiments recognise that by providing screens 117 having the space-sharing region 118, a seated passenger in one seat unit (e.g. the fore seat unit 109b) can use a relatively high space (provided by virtue of the upper part) above a relatively low space that can be used by a seated passenger in the adjacent seat unit (e.g. the aft seat unit 109) the other side of the screen. Thus, the arrangement is especially space-efficient.

Figure 2A:
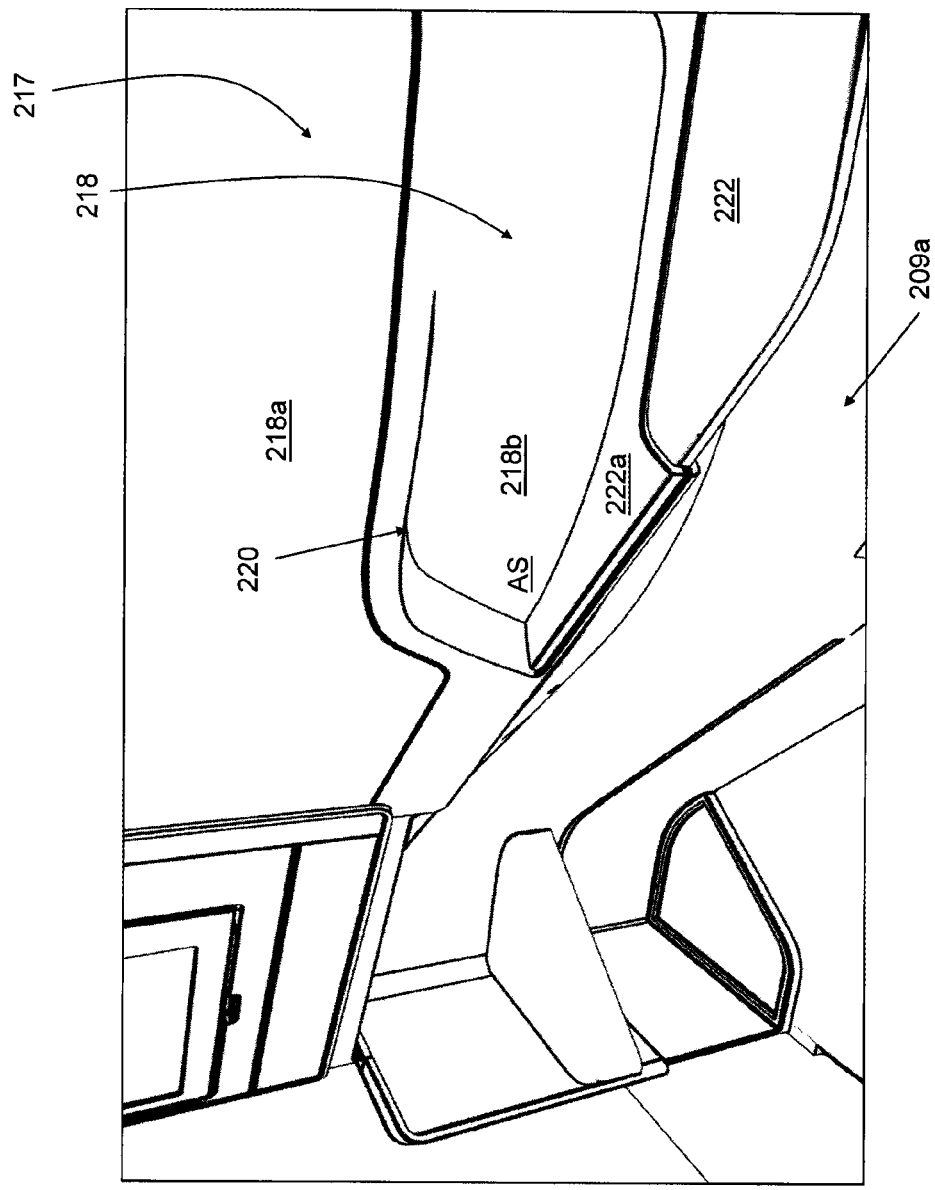
FIG. 2a is a view of a screen between two of the seat units in an arrangement according to a second embodiment, from above a first seat unit.
Figure 2B:
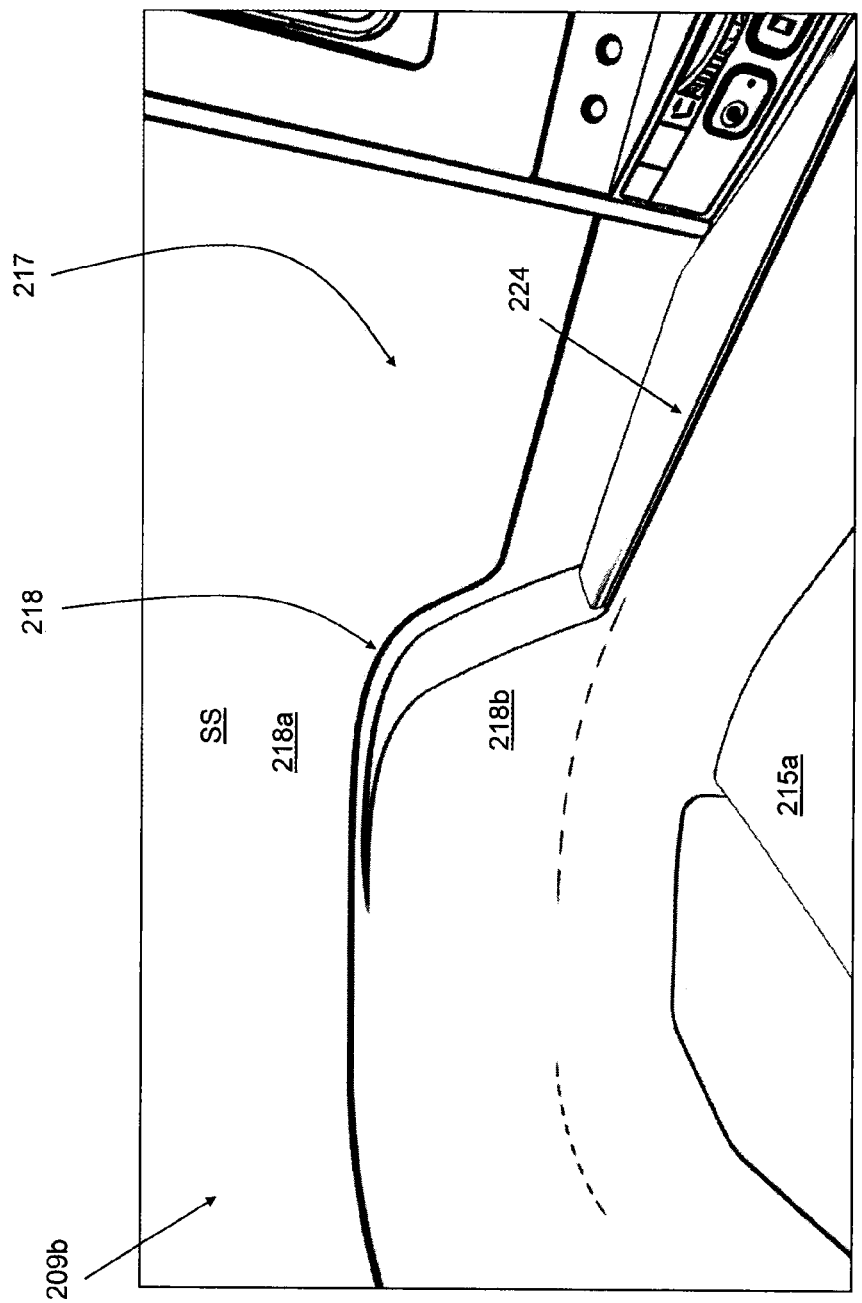
Figure 2C:
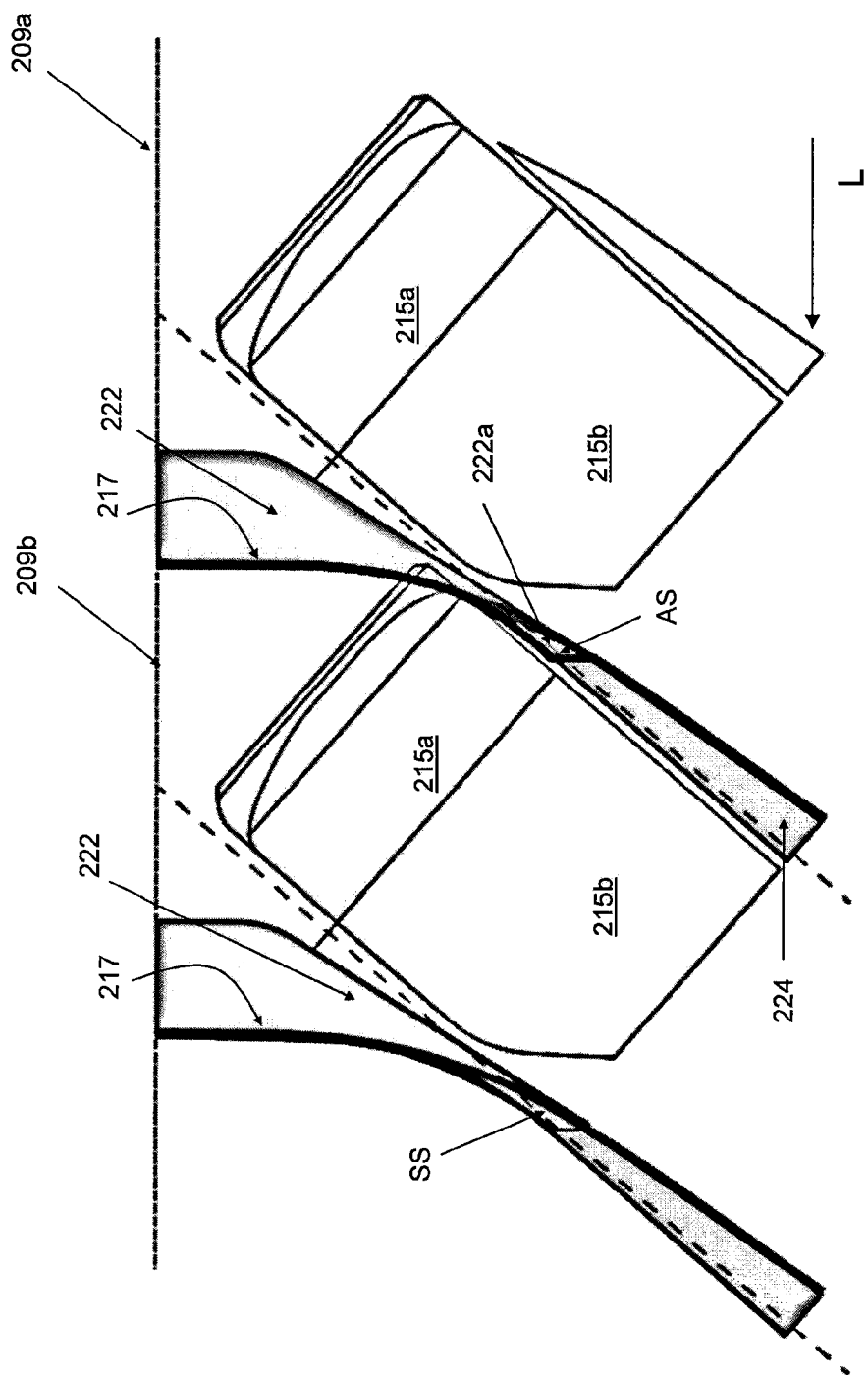
FIG. 2c is a schematic plan view of two of the seat units in the second embodiment, and showing the profile of the screen at two different heights.

FIGS. 2a-2c show a second embodiment. FIG. 2a is a view of a screen 217 between two seat units 209a, 209b from above the aft seat unit 209a in that pair, whereas FIG. 2b is a view of the screen 217 between the two seat units in FIG. 2a but from above the fore seat unit 209b of the pair (in both images the seat has been removed for the sake of clarity). FIG. 2c is a schematic plan view of the two seat units 209a, 209b, and showing the profile of the screen 217 at two different heights (as per FIG. 1e).

It will be appreciated that features in this embodiment (and in FIGS. 3a-3c) can be assumed to be substantially similar to those corresponding features in the first embodiment unless otherwise described. Like features are annotated with like reference numerals, but incremented by 100, 200 etc. appropriate depending on the embodiment. Unless otherwise stated, in all these embodiments the seat units are arranged in a single-aisle aircraft cabin in an inwardly facing herringbone layout (i.e. in general terms as per the layout in FIG. 1a). In the interests of clarity, not all reference numerals are necessarily shown in the Figures for all the seat units.

The second embodiment is broadly similar to the first embodiment except that for each screen 218 the upper and lower parts 218a/b of the space-sharing region transition at a relatively sharp interface. Furthermore, the armrest 222a in the arm space AS does not run parallel to the side of the seat pan 215b (see FIG. 2c). Instead it provides a narrower armrest surface, which does not overlap the seat pan 215b. It will be appreciated that the space-sharing region nevertheless allows some overlap between the arm rest and shoulder space for adjacent seated passengers.

Figure 3A:
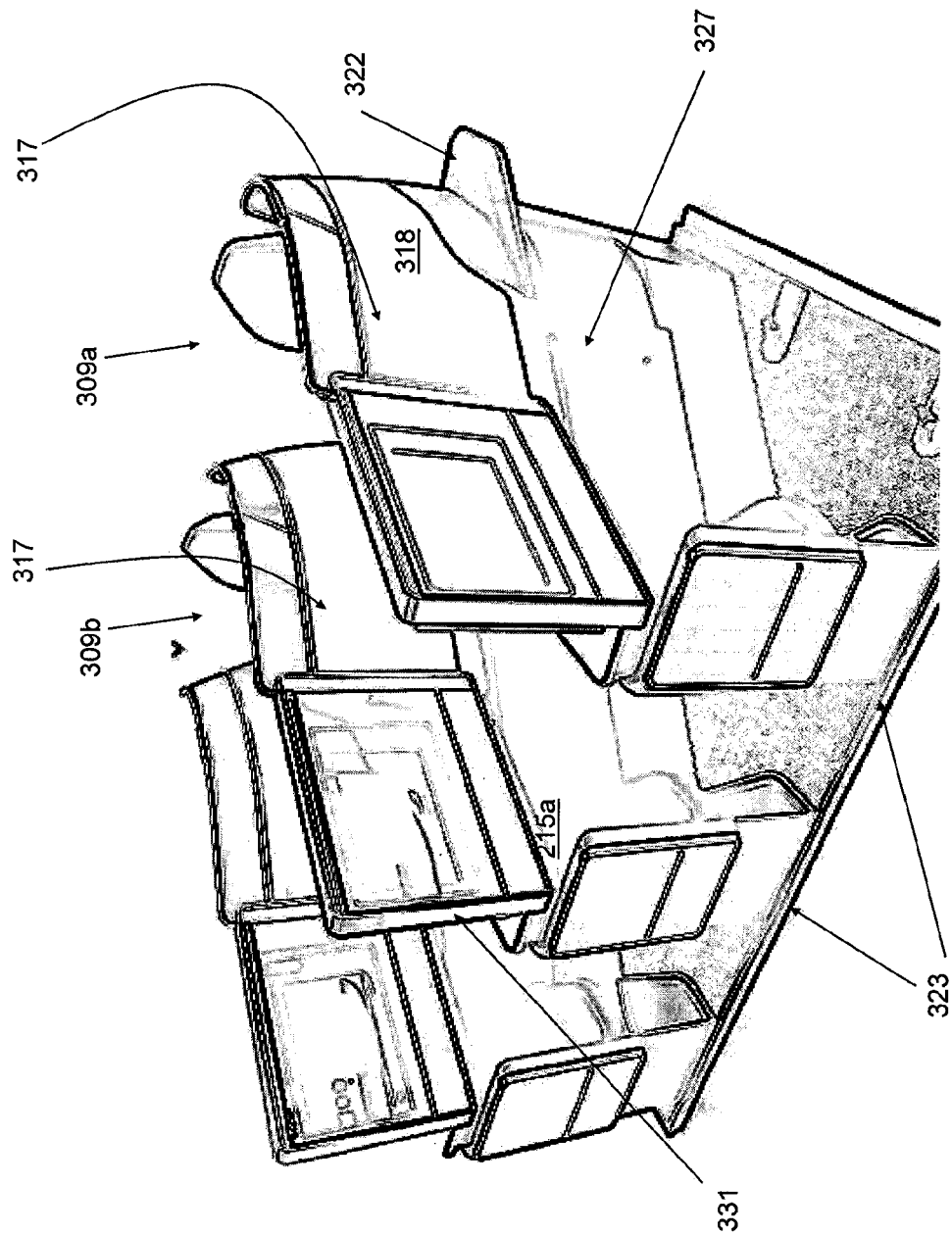
FIG. 3a shows part of a column of seat units in an arrangement according to a third embodiment.
Figure 3B:
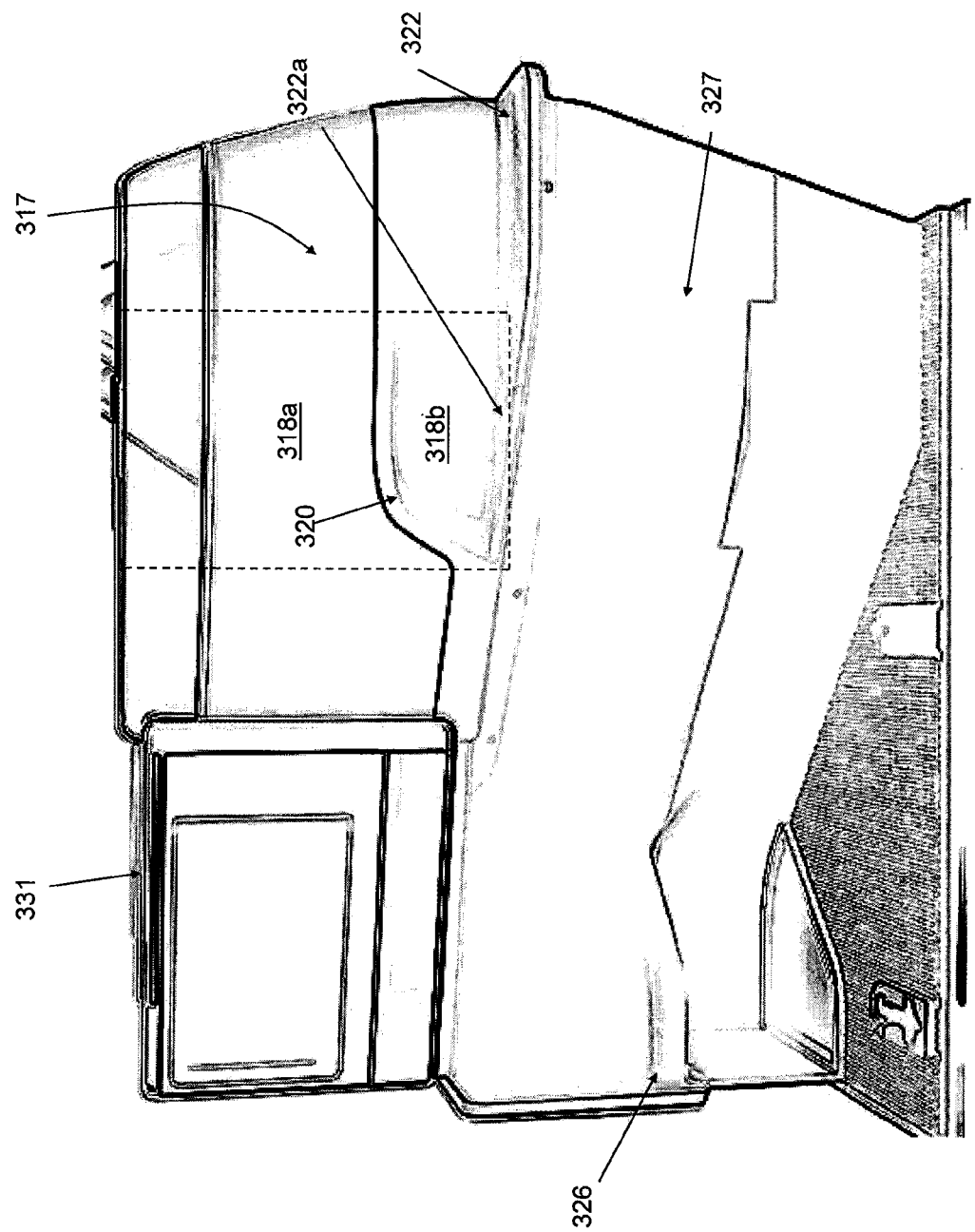
FIGS. 3b and 3c are views of one of the screens in the arrangement of FIG. 3a, from opposing sides.
Figure 3C:
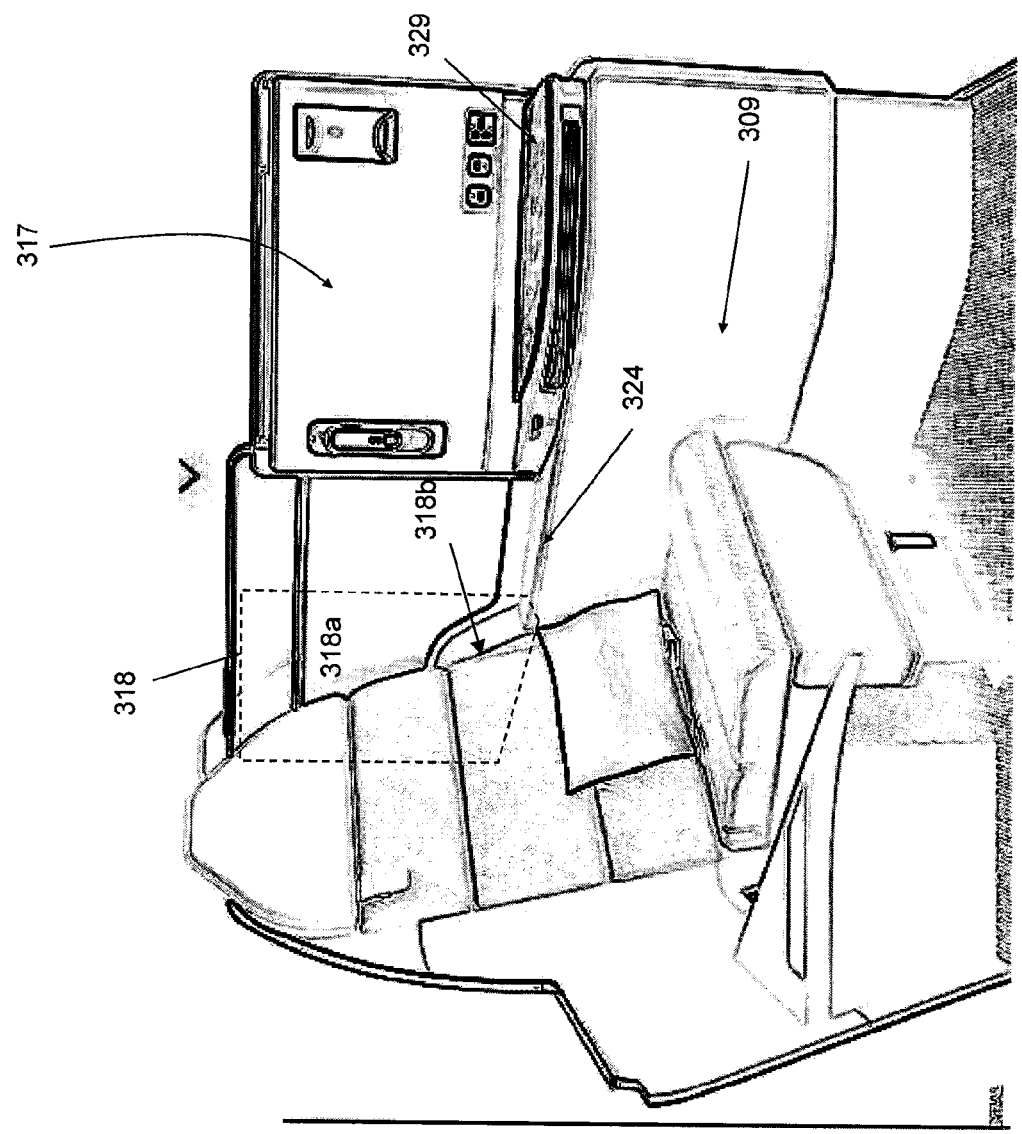

FIG. 3a shows part of a column of seat units in an arrangement according to a third embodiment. FIGS. 3b and 3c are views of one of the screens in the arrangement of FIG. 3a from opposing sides. The screens 317 are largely as shown in the second embodiment except that the space-sharing region 318 is a slightly different geometry that allows a marginally wider armrest to be located in the arm space, and provides slightly more shoulder space.

Whilst the present invention has been described and illustrated with reference to particular embodiments, it will be appreciated by those of ordinary skill in the art that the invention lends itself to many different variations not specifically illustrated herein. By way of example only, the layout may be a rearward-facing (inboard) herringbone. Whilst embodiments of the present invention tend to be most applicable to high angle/low pitch arrangements, the exact pitch, angle and width values need not necessarily be as described with reference to the above-mentioned embodiments.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A passenger seating arrangement in an aircraft cabin, the passenger seating arrangement comprising a column of seat units located adjacent an aisle, the column of seat units and the aisle both extending in a longitudinal direction parallel to the longitudinal axis of the aircraft cabin, and wherein the column comprises a plurality of seat units, arranged consecutively along the longitudinal direction, and
wherein each seat unit comprises a plurality of moveable seating elements such that the seat unit is configurable between a seating configuration in which the seating elements are arranged to form a seat having a seat pan and seat back, and a flat-bed configuration in which the seating elements are arranged to form a surface for a flat-bed, and
wherein in each seat unit, the seating elements are orientated at an acute angle to the longitudinal direction and face inwardly towards the aisle, and
wherein the arrangement comprises a plurality of screens, at least one seat unit located between two of the plurality of screens, each screen being arranged to respectively separate a passenger in a first seat unit in the column from a passenger in a second seat unit to one side of the first seat unit in the column, and
wherein each screen comprises a space-sharing region having an upper part and a lower part below the upper part, in which the upper and lower parts of the screen are offset relative to each other towards the first and second seat units respectively, such that the upper part provides shoulder space for the passenger in the second seat unit when the seat units are in the seating configuration, and the lower part provides arm space for the passenger in the first seat unit when the seat units are in the seating configuration.

2. The passenger seating arrangement according to claim 1, wherein the first seat unit is an aft seat unit, and the second seat unit is a fore seat unit in front of the first seat in the column.

3. The passenger seating arrangement according to claim 1, wherein a lateral direction extends perpendicular to the longitudinal direction, and wherein when the seat units are in the seating configuration, the seating elements of each seat unit are all at the same lateral position in the cabin.

4. The passenger seating arrangement according to claim 3, wherein the seat back of the second seat unit is adjacent the seat pan of the first seat unit, and wherein the space-sharing region of the screen is located between the seat back of the second seat unit and the adjacent seat pan of the first seat unit.

5. The passenger seating arrangement according to claim 1, wherein each first seat unit comprises an armrest located within the arm space created by the relative offset between the upper and lower parts of the screen.

6. The passenger seating arrangement according to claim 5, wherein each second seat unit comprises an armrest located forward of the armrest of the first seat unit, and on the opposite side of the screen from the first seat unit.

7. The passenger seating arrangement according to claim 1, wherein the space-sharing region comprises an inflection at which the screen transitions from the upper part to the lower part.

8. The passenger seating arrangement according to claim 1, wherein in the space-sharing region, the upper part of the screen overhangs the seat pan of the first seat unit when the seat units are in the seating configuration.

9. The passenger seating arrangement according to claim 1, wherein the screen extends from behind the seat back, and from adjacent the aircraft sidewall.

10. The passenger seating arrangement according to claim 1, wherein the acute angle at which the seating elements are orientated to the longitudinal direction is at least 45 degrees.

11. The passenger seating arrangement according to claim 1, wherein the pitch between consecutive seat units in the column is between 27 and 29 inches.

12. The passenger seating arrangement according to claim 1, wherein the column of seat units is adjacent the aisle on one side, and adjacent the aircraft sidewall on the other side.

13. The passenger seating arrangement according to claim 12, wherein the cabin comprises a second column of seat units on the opposite side of the aisle, the second column being arranged as described with reference to the first column.

14. A seat unit for use in a passenger seating arrangement in an aircraft cabin and for use in a column with other seat units located adjacent an aisle of the aircraft cabin, the column extending in a longitudinal direction parallel to the longitudinal axis of the aircraft cabin, the seat unit comprising:
- a plurality of moveable seating elements such that the seat unit is configurable between a seating configuration in which the seating elements are arranged to form a seat having a seat pan and seat back, and a flat-bed configuration in which the seating elements are arranged to form a surface for a flat-bed, and
- wherein the seating elements are orientated at an acute angle to the longitudinal direction and face inwardly towards the aisle; and
- a first screen being arranged to respectively separate a passenger in the seat unit in the column from a passenger in a first adjacent seat unit to a first side of the seat unit in the column and a second screen being arranged to respectively separate the passenger in the seat unit in the column from a passenger in a second adjacent seat unit to a second side of the seat unit in the column,
- wherein the first screen comprises a space-sharing region having an upper part and a lower part below the upper part, in which, the upper and lower parts of the screen are offset relative to each other towards the seat unit and the first adjacent seat unit respectively, such that the upper part provides shoulder space for the passenger in the first adjacent seat unit and the lower part provides arm space for the passenger in the seat unit when the seat unit and the first adjacent seat unit are in the seating configuration; and
- wherein the second screen comprises a space-sharing region having an upper part and a lower part below the upper part, in which, the upper and lower parts of the screen are offset relative to each other towards the second adjacent seat unit and the seat unit respectively, such that the upper part provides shoulder space for the passenger in the seat unit and the lower part provides arm space for the passenger in the second adjacent seat unit when the second adjacent seat unit and the seat unit are in the seating configuration.

15. The plurality of seat units according to claim 14 forming a passenger seating arrangement.

16. A passenger seating arrangement for use in an aircraft cabin, the passenger seating arrangement comprising a column of seat units, each seat unit being configurable between a seating configuration and a flat-bed configuration, wherein the seat units are arranged in an inwardly facing herringbone layout such that when the seat units are in the seating configuration, a seat pan of an aft seat unit is adjacent a seat back of a fore seat unit in front of the aft seat unit in the column, and
- wherein the arrangement comprises a plurality of screens and at least one of the seat units in the column of seat units is located between two of the plurality of screens, and
- wherein each screen is arranged to separate a passenger in the aft seat unit in the column from a passenger in the fore seat unit in front of the aft seat unit in the column, and
- wherein in a space-sharing region between the seat pan of the aft seat unit and the adjacent seat back of the respective fore seat unit, the screen comprises an upper part and a lower part below the upper part, the upper and lower parts of the screen being offset relative to each other to create an overhang on the side of the screen facing the aft seat unit, such that, the upper part provides shoulder space for a passenger seated in the fore seat unit, and the lower part provides arm space for a passenger seated in the aft seat unit.

* * * * *